(12) United States Patent
Johnsen et al.

(10) Patent No.: US 7,539,907 B1
(45) Date of Patent: May 26, 2009

(54) METHOD AND APPARATUS FOR DETERMINING A PREDICTED FAILURE RATE

(75) Inventors: Bjørn Dag Johnsen, Oslo (NO); Hans Ludwig Opheim, Slattum (NO); Predrag Hodoba, Heggedal (NO); Lars Paul Huse, Oppegård (NO)

(73) Assignee: Sun Microsystems, Inc., Santa Clara, CA (US)

( * ) Notice: Subject to any disclaimer, the term of this patent is extended or adjusted under 35 U.S.C. 154(b) by 442 days.

(21) Appl. No.: 11/418,796

(22) Filed: May 5, 2006

(51) Int. Cl.
*G06F 11/00* (2006.01)

(52) U.S. Cl. .......................... 714/47; 714/26

(58) Field of Classification Search ............ 714/26, 714/47
See application file for complete search history.

(56) References Cited

U.S. PATENT DOCUMENTS 6,934,673 B2 * 8/2005 Alvarez et al. ............... 703/21
7,426,554 B2 * 9/2008 Kennedy .................... 709/223
2002/0174384 A1 * 11/2002 Graichen et al. ............. 714/37
2004/0078634 A1 * 4/2004 Gilstrap et al. ............... 714/5

\* cited by examiner

*Primary Examiner*—Robert Beausoliel
*Assistant Examiner*—Charles Ehne
(74) *Attorney, Agent, or Firm*—Park, Vaughan & Fleming LLP (57) ABSTRACT

A method and apparatus for determining predicted failure rates for computational resources provided by a system comprising multiple components. The method comprises storing failure rate information about individual components and determining a current configuration of components within the system. The method further comprises identifying from the current configuration dependencies between components within the system. The stored failure rate information and the identified current configuration dependencies can then be used to generate predicted failure rates for the computational resources in the current configuration of the system.

23 Claims, 4 Drawing Sheets

METHOD AND APPARATUS FOR DETERMINING A PREDICTED FAILURE RATE

FIELD OF THE INVENTION

The present invention relates to predicting failure rates, for example in a computer system or a communications network.

BACKGROUND OF THE INVENTION

System reliability is very important in the computing field. A common approach for providing good reliability or availability in computing is through the use of redundancy, in which two or more components are provided to perform a given task. If one of these components fails, the remaining component(s) are still available to ensure that the task is performed. Incorporating redundancy into a system however adds to the expense of the system. Consequently, it is undesirable to replicate a component within a system if such replication has only a slight or no impact on the reliability and availability of the resulting system.

An assessment of availability is usually based on a statistic such as the mean time between failure (MTBF) or the average (or annualised) failure rate (AFR). The AFR inherently expresses a probability of failure within a specific time window, normalized to one year, and hence may be considered as a more directly useful measure of failure rate than MTBF. The AFR associated with a hardware product such as a server, compute blade, switch, IO adapter, etc, is an indication of the expected availability of the product. The AFR for various products can therefore be used in making decisions about how much redundancy to include within an overall system, based on the desired level of availability for the system. The AFR for existing products has generally been estimated at product design time, based on statistical data for low-level components and production processes associated with the product, and has therefore provided a static view of failure probability.

Projected availability in terms of aggregate AFR may be used as one of the provisioning parameters when deploying services on a clustered or distributed system. For example, the billing to a customer may be based on a certain level of service availability being provided over a lease period. It is therefore important for the service provider to be able to project the availability of the system even if the configuration on which the service is implemented varies with time while the service is being provided.

SUMMARY OF THE INVENTION

Accordingly, one embodiment of the invention provides a method of determining a predicted failure rate in a system comprising multiple components, where the system provides one or more computational resources. The method comprises storing failure rate information about individual components and determining a current configuration of components within the system. The method further comprises identifying from the current configuration dependencies between components within the system. The stored failure rate information and the identified current configuration dependencies are then used to generate a predicted failure rate for each of the computational resources provided by the system in its current configuration.

The predicted failure rates are therefore dynamic in that they reflect the current configuration, including allowance for the possible failure of components that support the computational resources. As a result, the predicted failure rates are more accurate and reliable than a conventional static prediction of failure rate. The dependency information may describe redundancy within the system. Such redundancy may be provided at the level of resources within the system and/or at the level of support components for the resources. The failure rate information may be provided in the form of an annualised failure rate (AFR), a mean time between failure (MTBF), or any other suitable form.

The system can use the predicted failure rates to control service provisioning across the computational resources (e.g. memory, processing power, network routing, etc). For example, a task for which there is a particular service level agreement can be allocated to a computational resource that is found to have a suitably low predicted failure rate. The system may also trigger some service action, such as the installation of additional redundancy, if a predicted failure rate is found to be too low to provide the desired level of service availability.

In one embodiment, the predicted failure rates are generated by a box manager associated with the system. The box manager may be included as part of a system, for example as a chassis manager, or may be provided as a separate unit. The box manager can report the predicted failure rates to a resource manager which is responsible for allocating work to the computational resources provided by the system. (The resource manager may be responsible for allocating work across multiple systems).

In one embodiment, the failure rate information relating to a field replaceable unit (FRU) is stored within the FRU itself, and is reported from the FRU to the box manager. Consequently, if a new FRU is inserted, the failure rate information for this new FRU is readily available within the system from the FRU itself. Another possibility is that at least some of the stored failure rate information about individual components is located remotely from the system and is retrieved by the box manager over a network. A further possibility is that the box manager itself stores failure rate information about certain components.

In one embodiment, the identified configuration dependencies are also used to determine fault zones within the system. A fault zone is defined such that no single point of failure can bring down more than one fault zone. Each computational resource is assigned to a corresponding fault zone. Since the fault zone determinations utilise the same dependency information as the failure rate predictions, it is convenient if the fault zone determinations are also performed by the box manager. The fault zone determinations can then be reported by the box manager along with the predicted failures rate to the resource manager.

In one embodiment, the method further comprises detecting a change in the configuration of the system, and updating the predicted failure rates in accordance with the changed configuration. There may be various reasons for the change in configuration. For example, the change may be due to some failure, such as an application crashing or a hardware fault developing. Another possible reason for the change is that a component may have been added to or removed from the system, for example in a service operation. The change in configuration may alter the predicted failure rate(s) for the system, for example by adding or eliminating redundancy. This may in turn lead the system to alter the provisioning of services on the computational resources provided by the system, dependent upon the revised predicted failure rates. For example, if a resource has become less reliable (higher failure rate) as a result of the change in configuration, it may be desirable to transfer one or more services from this resource to another resource with higher predicted availability.

In one embodiment, the method further involves monitoring and recording parameters relating to the hardware and/or software operational history of the system. Such parameters may for example relate to any temperature excursions suffered by the system, power supply anomalies, maximum transaction rate, etc. The recorded parameters can then be used as another input to the failure rate predictions to provide a value that is customised for the life-cycle history of the particular components within the system. For example, a component that has been operated for a prolonged period at high temperature may have a higher expected failure rate than one that has been kept within a more moderate temperature range.

In one embodiment, the recorded parameters may also be reported from the system to a log site, for example a web site accessible over the Internet. The reporting may be performed on an ongoing basis or in response to a failure in the system, such as an application crashing or a particular component generating a hardware fault. The report will generally also include information regarding the configuration of the system at the time of the fault. In some other embodiments, the report may just contain configuration information, without providing life-cycle parameters.

The information collected and collated by the log site from the field can then be analysed statistically to develop an improved failure rate model for the various components. In some cases, the failure rate model may simply represent a single number (e.g. the AFR value). In other cases the failure rate model may comprise an algorithm or formula to generate a predicted failure rate based on one or more inputs, such as current configuration and/or certain parameters relating to the operational history for that particular component.

In one embodiment, the log site (or other appropriate source) provides the updated failure rate model to systems in the field for generating the predicted failure rates. For example, a system may be able to download an updated failure rate model from the log site for installation into various components within the system. In other implementations, the updated failure rate models are not provided to existing systems, but rather are installed into new components at manufacture.

Another embodiment of the invention provides a method of operating a server for use in such a configuration. The method comprises receiving communications over a network from a population of multiple systems, where each system monitors parameters relating to the operational history of that system. The communications report the monitored parameters to the server. The reported parameters are used to update a failure rate model for the systems, and the updated failure rate model is then distributed from the server over the network to the systems. A system can then use the updated failure rate model system in predicting future failure rates for that system.

Other embodiments of the invention provide a system and a computer program and computer program product for implementing the various methods described above.

BRIEF DESCRIPTION OF THE DRAWINGS

Various embodiments of the invention will now be described in detail by way of example only with reference to the following drawings, in which like reference numerals pertain to like elements, and in which.

DETAILED DESCRIPTION

Figure 1:
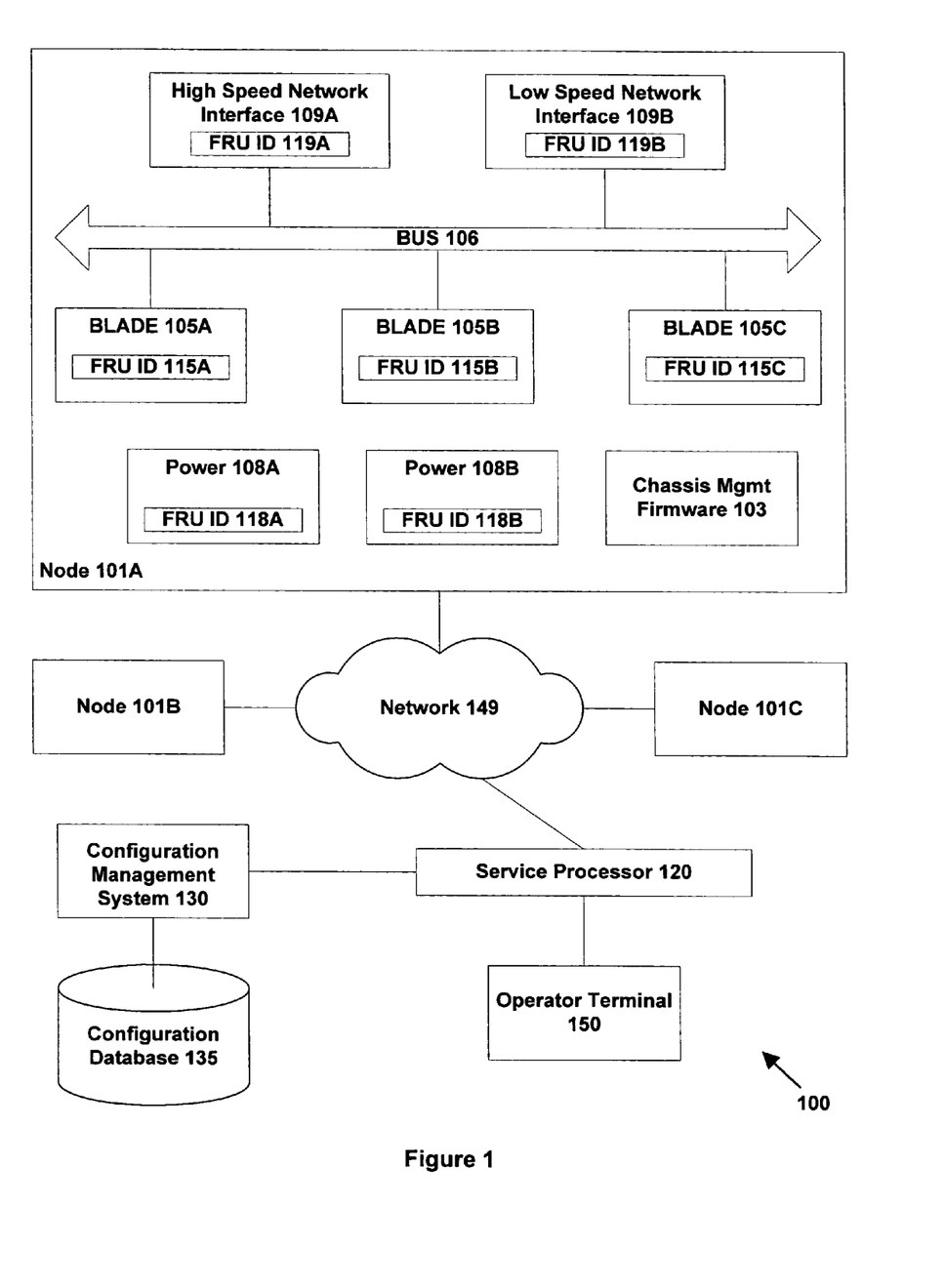
FIG. 1 provides a high-level schematic depiction of a computer system in accordance with one embodiment of the invention.

FIG. 1 is a schematic illustration of a computer system 100 in accordance with one embodiment of the invention. Computer system 100 comprises multiple nodes 101A, 101B, and 101C linked by computer network 149. Computer system 100 may represent a variety of possible architectures. For example, in one embodiment, nodes 101 may represent individual subsystems within a single distributed computer system. In another embodiment, nodes 101 may represent individual servers in a cluster of servers managed as a single group. In another embodiment, nodes 101 may represent communications nodes (switches or end-points) within network 149, in which case system 100 may correspond to the overall network. It will be appreciated that other systems may have more or fewer nodes than system 100 as shown in FIG. 1; in addition, the topology of network connections between the nodes may vary as appropriate.

FIG. 1 illustrates components within one node 101A in more detail (for clarity the internal structure of the remaining computing nodes 101B, 101C is omitted). The components shown in FIG. 1 correspond to an example embodiment where node 101A represents a server, but will vary as appropriate for other embodiments and implementations. It will be appreciated that the remaining nodes 101B, 101C of system 100 may have a structure that is generally analogous to that of node 101A, but the precise number and configuration of components within a given node may vary from one node to another.

Node 101A is shown in FIG. 1 as comprising three compute blades 105A, 105B, 105C (although in practice the number of blades in a server is likely to be much higher). Each blade is linked via bus 106 to a high-speed network interface 109A and also to a low-speed network interface 109B. Node 101A also includes chassis management firmware (chassis manager) 103, as described in more detail below.

Blades 105, power supplies 108 and network interfaces 109 represent field replaceable units (FRUs). An FRU represents a component that can be removed or replaced in its entirety by a service engineer in the field. Such a service operation might be triggered by the need to replace a faulty FRU, or to upgrade a system by inserting a new, more powerful FRU, or to remove a FRU, perhaps for use in another node.

Note that a FRU may incorporate one or more smaller FRUs. For example a server blade 105 might include a processor, memory, and possibly disk storage. Each of these components could then be provided as a separate FRU within the blade 105 in order to allow replacement or upgrade as necessary. For clarity, these additional possible levels for a hierarchy of FRUs are omitted from FIG. 1.

Each FRU in system 100 is provided with a memory, such as an electronically erasable programmable read only memory (EEPROM). This memory is used to store various information about the FRU, including identifying (ID) information such as device type and serial number. Thus as shown in FIG. 1, blades 105 include FRU ID information 115, power supplies 108 include FRU ID information 118, and network interfaces 109 include FRU ID information 119. Other details may be stored as appropriate in the FRU ID memory, such as manufacturer, manufacture date and so on.

Computer system 100 also includes a service processor 120 which is responsible for the general management of computer system 100. Linked to service processor 120 is operator terminal 150. If the service processor 120 detects an error within computer system 100, this error can be reported via operator terminal 150. Operator terminal 150 also allows a user to provide various commands and control information to computer system 100, such as configuration instructions and parameters. Note that if system 100 comprises a communication network, then a subnet manager may be used instead of service processor 120 to control configuration and general operations involving the network and the nodes in the network.

Computer system 100 further includes a configuration database 135 which is used by system 100 to store data about the identity and interconnection of the various components within computer system 100. For example, the information in configuration database 135 may indicate that blades 105A, 105B and 105C are all present and connected to bus 106. The configuration database 135 may also store information to the effect that node 101A has two power supplies 108A, 108B, and that these are redundant, thereby allowing node 101A to continue operations even if one of these two power supplies were to fail.

The configuration database 135 is accessed via configuration management system 130. Thus user configuration commands entered into operator terminal 150 are passed by the service processor 120 to configuration management system 130 for implementation, and the results are saved into the configuration database 135. The configuration management system 130 may also be responsible for preventing the user from setting a configuration that might damage the system. For example, thermal considerations may limit the amount of processing power that can be connected to bus 106. The configuration management system 130 can then be used to ensure that the number and/or power of the blades 105 attached to bus 106 does not contravene this limit.

The configuration management system 130 may also provide guidance to the user, for example, regarding the implications of a potential reconfiguration. Thus if a user wants to de-configure both power supply 108A and also power supply 108B, the configuration management system 130 may alert the user that this would, in effect, de-configure or shut down the whole of node 101A. The user can then be asked to confirm whether or not this is the intended result. Similarly, a user might want to know whether shutting down just power supply 108B by itself would prevent operation of node 101A. The configuration database 135 can then indicate that this would not be the case (assuming of course that power supply 108A is currently configured and operational).

The configuration management system 130 may also be set up to perform automatic (re)configuration, potentially in accordance with a set of user priorities or preferences. As an example, blades 105 may initially be configured to use high-speed network interface 109A for communications. However, if the configuration manager 130 detects that this interface 109A has failed, then the configuration manager may reconfigure blades 105 to use the low speed network interface 109B instead. Providing redundant combinations of components, such as multiple blades 105 and multiple power supplies 108 within node 101A, implies that a single point of failure within one redundant component is not fatal for the corresponding sub-system.

U.S. patent application Ser. No. 11/061,236, filed 17 Feb. 2005, entitled "Computer Network", and assigned to the same assignee as the present application, discloses a provisioning system to determine dependencies among resources. The provisioning system defines fault zones within a network to provide redundancy protection against single points of failure that could bring down a complete service or critical service component. Each fault zone is independent of other fault zones, in that a failure of a component within one fault zone should not impact the availability of services provided by another fault zone. A subnet manager can therefore configure first and second routes from a given source to a given destination to pass through two different sets of fault zones. This then ensures that there is redundancy in terms of communications between the source and destination, in that even if a failure does occur in one fault zone that breaks the first route, such a failure cannot break the second route which goes through different fault zones. U.S. patent application Ser. No. 11/061,236 is hereby incorporated by reference in its entirety into the present application.

Providing redundancy to avoid single point failures does not necessarily ensure that a particular AFR is satisfied. Rather, this is dependent not only upon the redundancy, but also upon the AFR of individual components within the system, along with the expected wait time for repairing or replacing any damaged components (assuming that redundancy allows the system to continue operations during this wait time). For example, if a particular component has a high individual AFR and/or the repair time for this component is long, then it may be desirable to provide increased redundancy for this component (e.g. providing three rather than just two units). Thus the AFR for an overall system can be set to a desired level by ensuring sufficient redundancy for key system components, according to the expected failure rate for such components, as well as the time for repair or replacement, if appropriate, to restore redundancy.

There may also be cases where the reliability of a single sub-system is high enough, i.e. low enough AFR, to allow a service to run with less or even no redundancy for that sub-system, at least for some limited period of time (e.g. if the service being provided comprises a task with a well-defined duration). Highly reliable sub-systems can frequently recover transparently from faults, and so may have an AFR that obviates the need for redundant provisioning of workloads onto multiple different systems. In particular, highly reliable sub-systems often incorporate their own internal redundancy, which may lead in effect to a hierarchy of redundancy, in other words redundancy at different levels in the system. For example, if we consider that system 100 as shown in FIG. 1 represents a single computing cluster (rather than a distributed network), then system 100 incorporates such a hierarchy of redundancy. Thus there is redundancy both at the node level (nodes 101A, 101B, 101C), and also within an individual node 101A (multiple blades 105, power supplies 108, etc). As a result of the redundancy within a given node, the AFR for that node may be sufficiently low to ensure an acceptable AFR for the complete system 100. The remaining nodes 101B, 101C may therefore not be needed for availability purposes, although they might be used to provide generally increased computing resources (processor power, storage, etc) for system 100.

It will be appreciated that the components of system 100 and individual nodes 101 are not necessarily fixed permanently, but rather the components within system 100 may change with time. For example, node 101A may have a blade 105 removed or an additional blade inserted. The AFR for a system or sub-system will then change in accordance with the new set of active components in the system (or sub-system). If system 100 corresponds to a network, the population of member nodes 101 in the network may be inherently dynamic. The AFR associated with any route through fault zones of the network may therefore be different each time the network is booted, or after any node joins or leaves the network.

In order to accommodate such variability, in accordance with one embodiment of the present invention, the chassis management firmware 103 within a node includes an algorithm to compute or access the AFRs from individual subsystems within the chassis, e.g. from blades 105A, 105B, etc. Note that in some cases the AFR for a FRU may be stored within the FRU ID memory for that FRU, from where it can be accessed by the chassis management firmware. In other cases, the chassis management firmware 103 may itself calculate the AFR, based on information about the components within the FRU. Such information might itself be stored within the FRU ID memory, or might be ascertained by testing or interrogating the FRU, for example to determine the amount of storage provided on the FRU. Another possibility is that once the chassis management firmware has ascertained the identity of a FRU (e.g. in terms of part number), corresponding information about the AFR for the FRU might be retrieved from a remote database over a network such as the Internet The chassis management software 103 can pass the AFR information that it has collected to the service processor 120 to provide a consolidated view of failure rate information for the whole system 100. In other embodiments, the service processor 120 may be responsible for directly obtaining AFR information from the various components within the different nodes 101 (rather than using the chassis management firmware as an intermediary).

In one embodiment, system 100 corresponds to nodes distributed across a communications network, the chassis management firmware 103 corresponds to a box manager (BM), and the service processor 120 corresponds to a network fabric manager (FM). The box manager knows about the resources and support systems within a particular physical unit (e.g. a node or some other structure). In particular, the box manager knows the dependency relationships between the resource units and the support units, including any redundancy provided within the box. Note that although the box manager may be provided as chassis management firmware, it may also be implemented as a separate subsystem linked to the chassis or in any other appropriate manner.

The BM is therefore concerned with relatively low-level information, using details about dependencies and predicted failure rates for the various physical components (such as the FRUs) within a given box to determine the resources available within the box, the allocation of such resources to one or more fault zones as appropriate, and the predicted failure rates for the resources and the fault zones. In particular, the BM uses the information that it receives from the various FRUs about individual component dependencies and failure rates to predict overall failure rates for given resources and fault zones. Such predictions therefore take into account the extent to which a set of supporting components represents a redundant set, or if each component represents a separate supporting function. In this way, the generated AFR depends on what supporting components are reported as being present and operational (rather than just looking at internal failure rates for individual components). The resulting AFR for a resource therefore represents the combined probability of failure both for the resource itself, as well as for any supporting component (or redundant set of supporting components) that would cause the resource to stop being operational.

The box manager communicates with the fabric manager using the BM-FM protocol described in the above-referenced U.S. application Ser. No. 11/061,236. In particular, the BM informs the FM of the resources for which it is responsible, the fault zones that they are located in, and predicted failure rates for these resources and fault zones. The FM therefore has a higher-level perspective than the BM; in effect, the BM shields the FM from having to know about the underlying physical implementation of the computational resources. Thus the FM is concerned with the logical components of resources and fault zones and the allocation of these resources to provide computing services that are utilized directly by applications, such as communications, storage, computation, etc.

The FM uses the fault zone and predicted failure rate information to make decisions at a logical level involving the allocation of the available resources and fault zones to particular applications, routes, etc (as appropriate). For example, the FM might assign an application to two resources that are in different fault zones to ensure that the task can continue even if there is a failure of one of the resources or fault zones. (N.B. The two different fault zones may be in the same chassis or might be in different chassis).

Figure 2A:
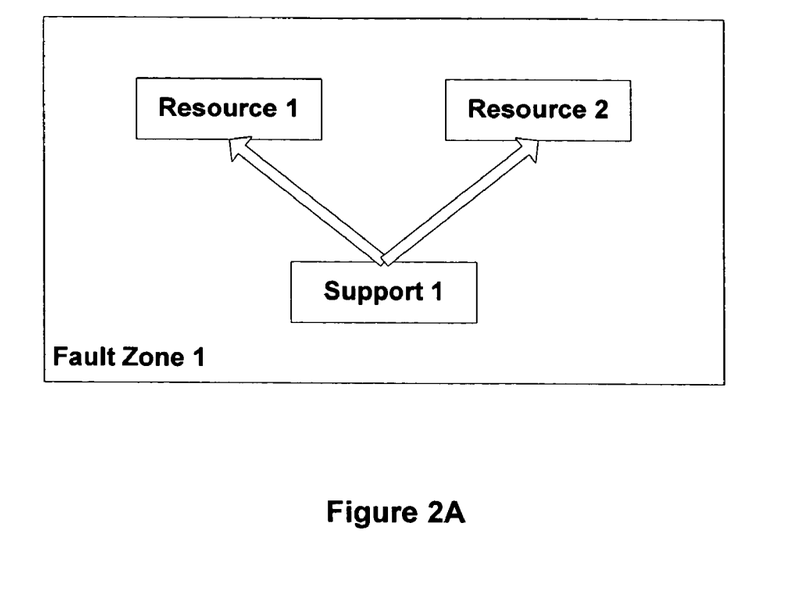
FIGS. 2A and 2B are schematic diagrams of the configuration of resources and support services into fault zones in accordance with one embodiment of the invention.
Figure 2B:
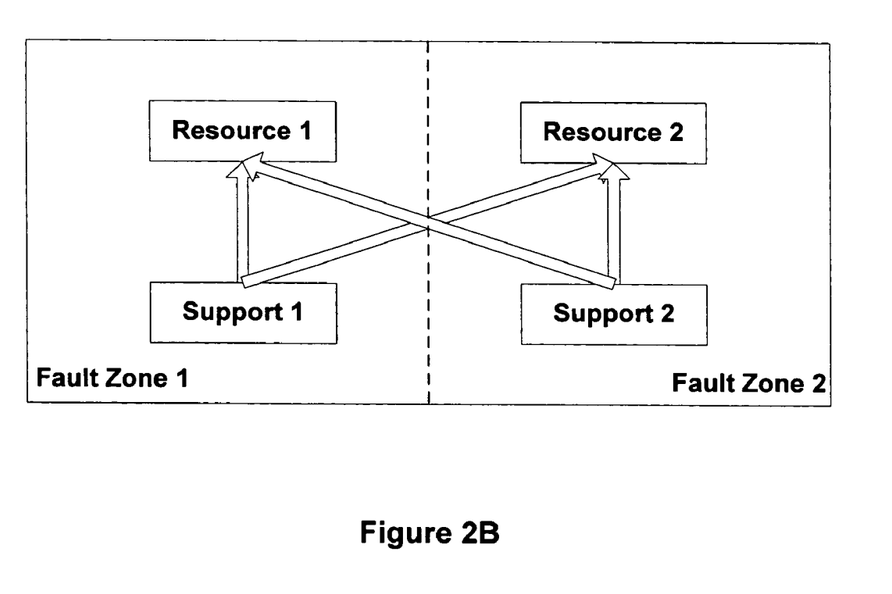

FIGS. 2A and 2B are schematic diagrams that depict two possible resource configurations. In FIG. 2A, two resources (R1, R2) share a single support service (S1); this configuration might correspond to two blades sharing a single power supply. Note that in this configuration, the support service S1 represents a single point of failure for the two resources R1, R2, and so R1 and R2 are both located in a single fault zone (Z1). It will be seen from this example that if two resources share the same fault zone (as in FIG. 2A), the main contributor to the failure probability may be a component that is private (internal) to the resource itself, or else some shared support service within the fault zone (i.e. S1, in the context of FIG. 2A).

In FIG. 2B, the same two resources R1, R2 are present, but now there are two support services S1, S2. Resource 1 and Resource 2 can access both support services S1, S2, but each resource only requires a single one of these two support services to be operational. Hence support services S1, S2 represent a redundant configuration, and we can now place R1 and R2 into separate fault zones (FZ1, FZ2), since they do not share a single point of failure.

If two or more resources are in separate fault zones, then it can be assumed that the resources will fail independently, with a probability that is reflected by the current AFRs for the resources. Of course, there may still be shared redundant sets of supporting components (i.e. S1 and S2 in the context of FIG. 2B), and so in theory there is some overlap in failure probability, despite the resources being located in different fault zones. Nevertheless, the assumption of independence is valid, providing the risk of simultaneous failure within a redundant set is very low. This is because if one of the support components was to fail, which would in effect transition the system from the configuration of FIG. 2B to that of FIG. 2A, thereby allowing the predicted failure rates to be recalculated to reflect the updated configuration.

If two or more resources are in a common fault zone, then (by definition) they can all be subject to the same single point of failure. In such circumstances, it may be useful to be able to discriminate between the probability that an individual resource fails and the probability that a shared supporting component fails so as to bring down some or all of the resources in the fault-zone. This discrimination can be performed by distinguishing between AFRs that are specific (private) to individual resources (e.g. a compute blade) and AFRs that are more generally associated with the corresponding fault zone, e.g. the supporting power and cooling infrastructure.

Thus for the configuration of FIG. 2A, we can write:

$$AFR(FZ1)=AFR(R1)+AFR(R2)+AFR(S1)$$

where AFR(R1) represents the AFR internal to R1. Note that this failure rate for FZ1 incorporates a partial failure, in which either R1 or R2 fails. The system may still be able to continue operating in such circumstances, albeit with diminished capabilities. The overall failure rate for resource R1 (including the possibility of resource R1 becoming unavailable due to a problem with support service S1) is given by: AFR(R1)+AFR(S1), while the corresponding failure rate for R2 is given by: AFR(R2)+AFR(S1).

If we are only interested in a complete failure of the fault zone, such that no processing resource is available, then:

$$AFR(FZ1)=AFR(R1+R2)+AFR(S1)$$

where AFR(R1+R2) represents the failure rate for a combined failure of both R1 and R2. This can be determined from knowledge of AFR(R1) and AFR(R2) plus the expected repair or replacement time for R1 and R2, assuming that internal failures in R1 and R2 occur independently of one another (given that we have allowed separately for a failure of the shared power supply). Thus AFR(R1+R2) is based on the product of the individual failure rates for R1 and R2, and so can often be considered as a second order effect in comparison with the failure rate for S1.

For the configuration of FIG. 2B, we can write:

$$AFR(FZ1)=AFR(R1)+AFR(S1+S2)$$

$$AFR(FZ2)=AFR(R2)+AFR(S1+S2)$$

Note that AFR(FZ1) corresponds in effect to resource 1 becoming unavailable, while AFR(FZ2) corresponds in effect to resource 2 becoming unavailable. The value of AFR(S1+S2) (i.e. failure of both the redundant power supplies S1, S2) can be determined from knowledge of AFR(S1) and AFR(S2), plus the expected repair or replacement time for S1 and S2, assuming again that failures in S1 and S2 occur independently of one another.

If there is a component failure that causes multiple resources to become dependent upon a single (supporting) FRU, there will be a set of fault zone change events to cause all the corresponding resources to become members of a single fault zone with a single associated AFR. For example, if S2 in FIG. 2B fails, then the system returns in effect to the configuration of FIG. 2A, with just a single fault zone. Note that such a reconfiguration increases the predicted failure rate for R1 and R2. Thus as previously determined, the failure rate for R1 in FIG. 2B is AFR(FZ1)=AFR(R1)+AFR(S1+S2) (since failure of FZ1 in effect ensures that R1 becomes unavailable), while the failure rate for R1 in FIG. 2A is given by AFR(R1)+AFR(S1). Since AFR(S1+S2) is based on the probability of a combined failure of S1 and S2 (generally calculated as a product of probabilities), it is likely that AFR(S1)>>AFR(S1+S2). In other words, once the redundancy between S1 and S2 is lost, then the risk of resource R1 becoming unavailable increases significantly.

As previously discussed, in one embodiment only the box manager is aware of the configuration details shown in FIGS. 2A and 2B. Based on these details, the BM then supplies the FM with information about the available resources (R1 and R2), the fault zone in which each resource is located, and the predicted failure rate information.

Note that there are various possible formats for the provision of AFR information from the BM to the FM. For example, in one embodiment, the AFR supplied for a given resource may incorporate the AFR for failure of the fault zone containing that resource. In this case, the BM does not have to provide the FM with AFR information for the fault zones themselves (unless the FM particularly wants this information to discriminate between failure of the specific resource and more general failure of its fault zone). In another embodiment, the BM might provide one AFR for the resource per se, and another AFR for the corresponding fault zone per se. The FM would then add these two figures together to get a combined AFR for the overall (non)availability of the resource, taking into consideration both failure of the resource itself and also failure of the associated fault zone. It will be appreciated that the BM-FM protocol can specify the appropriate format for the AFR information to be passed from the BM to the FM.

Figure 3:
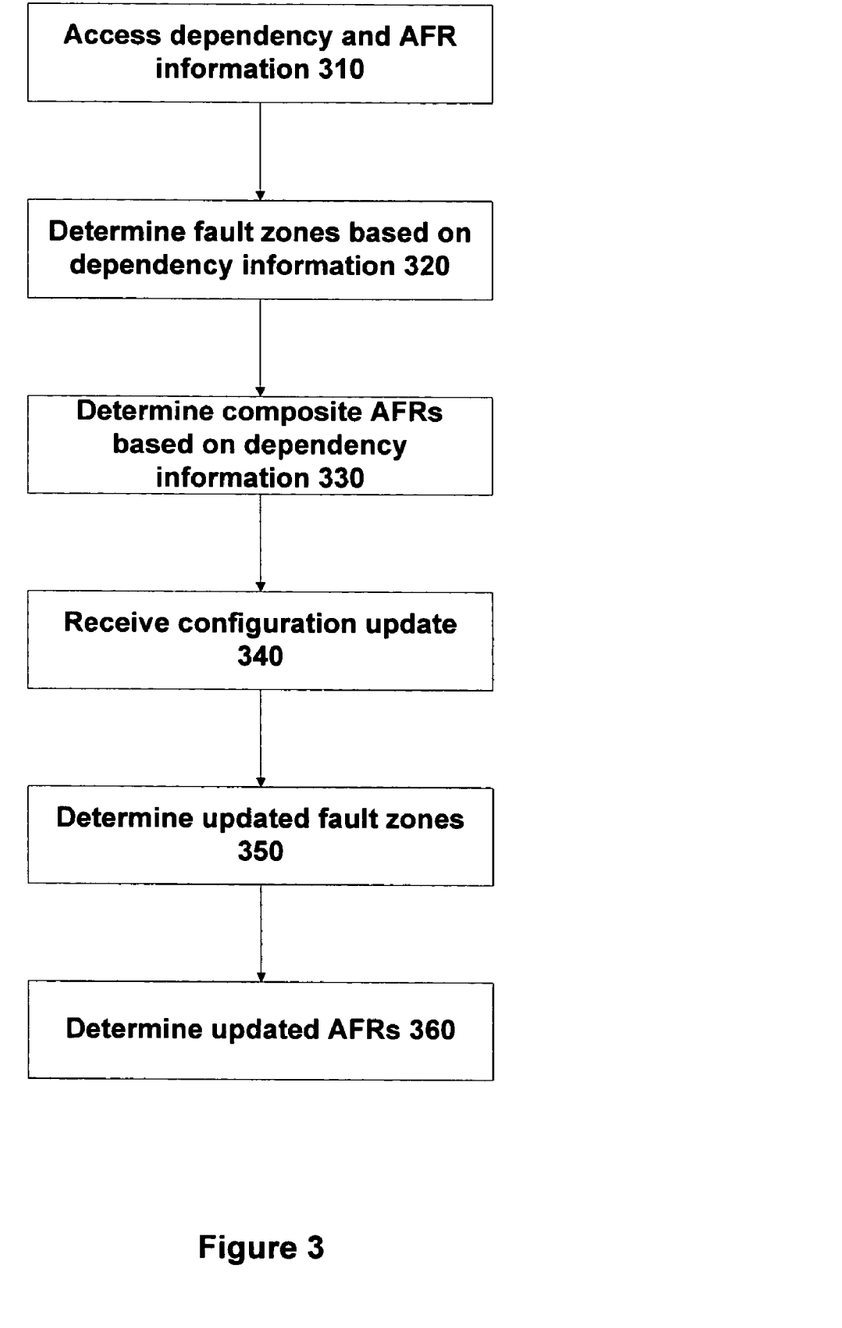
FIG. 3 is a flowchart depicting a method for determining predicted failure rate in accordance with one embodiment of the invention.

FIG. 3 is a flowchart depicting a method for handling and predicting failure rate information in accordance with one embodiment of the invention. The method commences with the collection or accessing of dependency information and failure rate information from various components in the system (310). The dependency information reflects the current configuration and operational status of the resources and other devices being managed.

The system uses the collected information to determine fault zones based on the dependency information (320), for example using the approach described in above-referenced U.S. patent application Ser. No. 11/061,236. The predicted failure rates for the various resources in the system are now determined using the dependency information (330). The calculated failure rates take into account not only the failure rates for components within a particular resource, but also for components in devices that provide support to this resource (but are not within the resource itself). In particular, the predicted failure rates are sensitive to the current configuration (including operational status) of resources within the system. The predicted failure rates may be further dependent upon life-cycle data for the system, which may also be available from or for the various devices (as described in more detail below).

It is now assumed that a system or configuration update is received (340). This update may indicate that a particular resource or component within the system has become non-operational, or perhaps that an additional component has been inserted into the system. The dependency information associated with this change to the system is also provided and allows updated fault zones to be determined (350). In addition, the predicted failure rates are updated, if appropriate, to reflect the new configuration (360). The updated failure rate information can be used to ensure that a particular service level agreement is still satisfied. For example, if the update represents a failed or deconfigured component within the system, thereby reducing or eliminating a certain redundancy within the system, the new failure rate information might be used to determine a service or repair schedule for the system. Thus if the newly predicted failure rate, assuming a standard period for replacing the failed component, is found to be too high for the agreed level of service, this may trigger a more urgent service action to restore full redundancy in the system.

In one embodiment, the processing of FIG. 3 is primarily performed by a box manager. The box manager may be physically associated with the relevant components, or may be separate from these components but linked by a suitable network connection. As previously described, in this embodiment the box manager is responsible for accessing the dependency and AFR information for system components, and using this information to determine fault zones and overall AFR values for the resources and fault zones in the system. The BM then notifies the FM of the determined dependencies and failure rates to allow the FM to allocate work across the available resources. In one implementation, the determination of dependencies by the BM is based on FRU locations and FRU information stored in FRU EEPROM, based on the approach described in U.S. patent application Ser. No. 11/061,236. Alternatively, the BM may access at least some information about a FRU (e.g. the AFR values) from some external source, for example a component database accessible over a network. Allowing the BM to acquire FRU information from a variety of sources helps to improve compatibility by allowing the BM to obtain information about certain FRUs that may themselves not provide full support for the approach described herein. In addition, providing the FRU dependency information in a standardised format to the BM allows the BM to be implemented in generic fashion.

Note that in some embodiments, the determination of failure rates based on the dependency information (whether performed by a BM or some other component) may be performed on a separate system—i.e. not on the system to which the failure rates relate. For example, the system may report the dependency information over a network to a server, which then processes the dependency information to provide back the predicted failure rates.

As previously indicated, the AFR associated with a hardware product, e.g. a server, compute blade, switch, 10 adapter, etc, and recorded in FRU ID or elsewhere, has conventionally been generated at product design time based on statistical data for low-level components and production processes. Such an AFR therefore provides a static view of failure probability, and so does not take into consideration a number of factors that may have a significant bearing on availability predictions. For example, at the hardware level, component aging, usage patterns (e.g. accumulated power-on time, number of power-cycle operations etc.), environmental influences (e.g. average operating temperatures, duration and degree of any episodes of excessive heating), anomalies in power supply, and so on, may all have a substantial impact on the likely future reliability and availability of a given component. In addition, it must be recognised that design-time estimates may be subject to error or inaccuracies. For example, such estimates might overlook various subtle design errors that could influence the actual experienced availability of the component. For software products, estimated AFR may be incorrect due to latent bugs, operator errors (perhaps due to poor human interface design), as well as various kinds of workload dependent problems, such as contention and resource shortages.

In accordance with one embodiment of the invention therefore, the chassis manager 103 constantly monitors various life-cycle data such as outlined above, e.g. the power-on time, temperature, etc, of the various components within node 101A. This monitoring information is then stored at the component (FRU) level, for example within the FRU ID memory, or in any other appropriate location, and can be used subsequently to generate an estimated AFR for the component. Such an approach therefore allows the estimated or predicted AFR to be customised in accordance with the age and life-cycle history data for that particular component.

The algorithm for generating the predicted AFR based on the life-cycle data may be determined during development and stored into the FRU ID memory or some other appropriate location at manufacture. In some implementations, a new formula or algorithm for determining the AFR may also be provided to the chassis manager during its operational life, for example via an upgrade installation, or by downloading over a network from some central site. (This might be seen as analogous to downloading virus definition updates for personal computers).

In one embodiment, the formula for AFR calculation may take the original AFR as an input, and then modify this value in accordance with the life-cycle data. For example, the AFR algorithm might perhaps raise the base or original AFR (i.e. the AFR conventionally used, without consideration of life-cycle data) by one percent for each hour that the system spends above a threshold temperature. In a more complex algorithm, the increase in AFR might be dependent both on the time spent above the threshold temperature, and also on the amount by which the threshold temperature was exceeded. Alternatively, the algorithm might potentially generate the AFR based only on the current set of life-cycle data—i.e. without needing the original AFR value as input.

The formula for AFR prediction may be modified or updated to reflect accumulated experience data for as much of the complete (global) component population as practicable. One option is to collect such experience data from components that are returned to the vendor service depots for analysis and repair. A more encompassing approach is for chassis managers to report failure events along with all relevant component life-cycle data to a global log site, e.g. using the same basic communication schemes that are used for downloading updated formulae. This then allows monitoring and tracking of non-fatal error events that are repaired without any component replacement and/or service call (e.g. by means of simple reboots or resets).

Such an approach can provide statistics for the global component population, thereby allowing an accurate correlation to be made of failure rates with specific life-cycle data. The resulting statistics can then be incorporated into the formulae that are made available for dynamic distribution to chassis managers.

Software errors can be handled in an analogous way. A chassis manager can detect and report such errors to some global log site, where they can be correlated with aspects such as operating system level, hardware configuration, and so on. This can then result in a formula or algorithm to distribute back to the chassis managers for local prediction of failure rates. A similar approach may also be employed to handle operator errors. For example, it may be found that on average, in a particular application, a user makes an incorrect entry that causes the application to crash perhaps 0.1% of the time. This information can then be used, in conjunction with workload information, to generate a predicted failure rate for the application.

In general, it is not expected that the parameters used for predicting software or operator errors will be overly detailed. For example, they may be limited to the specification of on-line transaction processing (OLTP) or Web services, with a certain load level in terms of number of transactions and users. This is because more detailed workload information is likely to be site or organization specific, and may well include confidential information that must be retained within the owning organization. On the other hand, many organizations make use of very large server farms or GRID systems with thousands of compute and IO nodes. In such circumstances, an organization-specific logging and event correlation service can be implemented to correlate system-related failure events with well-defined workload descriptions. This would then allow failure rates to be predicted for specific workloads implemented on specific system image versions for the global population of systems within that particular organisation.

Although a chassis manager has been described above as responsible for monitoring life-cycle data, communicating with a global log site, and implementing the failure rate algorithms, it will be appreciated that some or all of these responsibilities may be shouldered by one or more other components in system 100. For example, a resource or fabric manager that is controlling various compute and IO resources may use the BM-FM protocol in above-referenced U.S. patent application Ser. No. 11/061,236 to track current AFR information provided by box managers associated with the available compute and IO resources. The resource manager may also track information relevant to the system image and workload. By correlating all this information using the available AFR formula, the resource manager can then perform provisioning to distribute workload elements so as to try to maximize overall projected system and service availability.

Figure 4:
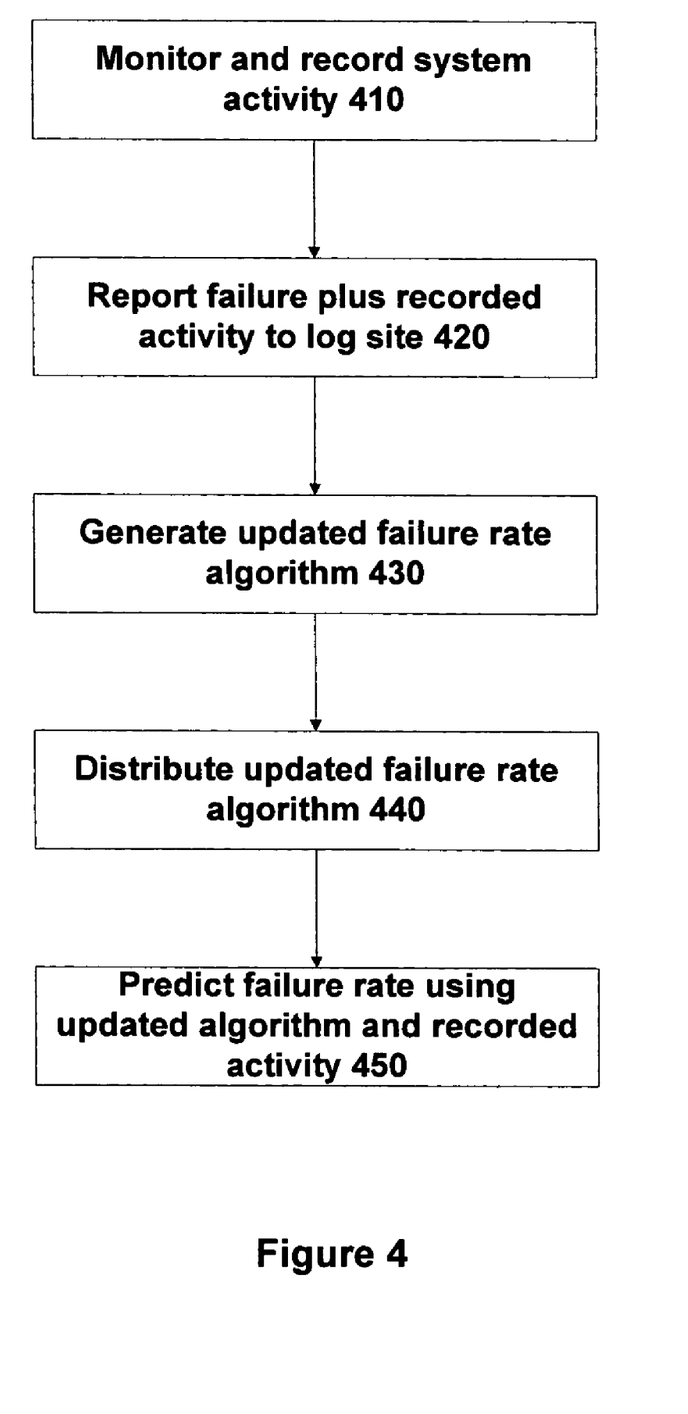
FIG. 4 is a flowchart depicting a method for determining predicted failure rate in accordance with another embodiment of the invention.

FIG. 4 is a schematic flowchart for using life-cycle data and/or an updated failure rate model to predict failure rates for a system in accordance with one embodiment of the invention. The method involves monitoring and recording various parameters relating to system activity (410). The parameters being monitored may be relevant to hardware, such as operating temperature and/or to software, such as application usage. Note that many existing systems already incorporate tracking of these parameters at some level within the system, for example for diagnostic purposes in case of a system failure. The monitored data can be saved in any appropriate location. For example, parameters relevant to hardware availability might be stored in FRU ID memory, whereas parameters relevant to software reliability might be stored in a system log file. The monitoring of operation 410 may be performed by the box manager or some other suitable component in the system.

In one embodiment, if a system failure is detected at the hardware and/or software level, this is reported to a log site (420) (for example, by the box manager). The failure report may be accompanied by current configuration information and/or by data representing the recorded activity of the system. Assuming that the log site receives such failure reports from many different systems, it can perform a statistical analysis of the reports to correlate failure information against the life-cycle and/or configuration data. This then allows a failure rate model to be developed that is not limited to the internal design of the component itself, but also reflects the influence on component failure rate of configuration and/or life-cycle data. For example, it may be found that a software application is particularly likely to crash if the transaction rate exceeds a certain level, or that a hardware unit is particularly likely to develop a fault if it suffers a voltage spike.

The failure rate model can then be used to generate predicted failure rates using the data collected from a large population of systems. In some cases, the model may comprise a simple number, namely the predicted failure rate for a given component, taking into account the number of failures experienced in the field. Alternatively, the model may comprise an algorithm or formula to allow the failure rate of a system or component to be predicted based on life-cycle and/or configuration data for that component or system. The updated algorithm can then be distributed to systems in the field, and if appropriate, installed into individual components (440) for use in failure rate predictions (450). The updated algorithm may use the locally recorded life-cycle data for that particular system (if available) to enhance the accuracy of the predicted failure rates.

It will be seen therefore that the dynamic approach of FIG. 4 replaces the conventional static view of failure rate calculations. In particular, failure rate predictions can now take into consideration:

a) current system configuration;
b) life-cycle history for the system; and/or
c) an updated failure rate model derived from real failure data collected from a population of systems in the field.

Note that some embodiments may generate dynamic failure rate predictions based on only one or two of these considerations. For example, for some embodiments (or for some components within some systems) the system may not track or record activity, but it may still receive updated models for failure rate predictions (in such case the model would not have any recorded activity available as input). In other embodiments, a system (or components therein) may monitor and record activity for use in failure rate predictions in accordance with a fixed or predetermined algorithm or model that is loaded into the system at manufacture, and which is not subject to subsequent update. Note that such a system may or may not be configured to report its failure information to a log site. For example, with reference to FIG. 4, operations 410 and 420 may be performed by a first subset of systems in the field, operations 430 and 440 by the log site, and operation 450 by a second subset of systems in the field, where by there may be complete, partial, or no overlap between said first and second subsets of systems.

It will be appreciated that the approach described herein for generating and making use of dynamic AFRs as availability indicators based on a statistical analysis of large populations is different from known techniques for predictive (fault) analysis (PA). The difference can be appreciated by analogy with healthcare. Thus predictive analysis is concerned with monitoring and analysing specific data streams related to specific components (individuals), analogous to a doctor taking blood samples and performing various other tests and investigations in order to make sure that a specific patient is healthy, or to diagnose a specific (potentially latent) disease. In contrast, the approach described herein can be considered as analogous to the activity of identifying health risks within a population based on global statistical records, for example keeping track of all cancer cases within a population and deriving a risk rate that is correlated to factors such as working in a particular chemical industry and/or smoking, as well as the time the individuals have been exposed to the assumed risk factors, and then applying these global health risks on a probabilistic basis to individuals.

Although the embodiments described so far have relied upon the automatic update of AFR information, it will be appreciated that some systems and/or components may have a facility to support the manual update of AFR information. Such manual update might for example alter a stored AFR value and/or a formula or algorithm used to predict a system failure rate based on life-cycle data. In some cases it may be possible to apply the manual update via normal operator input (e.g. through terminal 150), while in other cases the update might have to be applied through a special service connection to the relevant component.

In some embodiments, the system (or some components thereof) may use a predicted failure rate derived from the AFR (rather than the AFR itself). For example, a conservative or pessimistic system might use a parameter k.AFR when making decisions relating to resource availability, where k is a multiplier (e.g. k=2, 5 or 10). In other words, if a component specifies a particular AFR value, the system might take this as an underestimate of the actual failure rate in order to provide an operational safety margin. One possibility is that the policy discriminates between types of AFR values (or AFR values for different types of systems). For example, if an AFR value is indicated as derived from field service data, it may be treated as more reliable than an AFR value predicted at manufacturing (this may in turn make it reasonable to adopt a lower value of k, since a smaller safety margin may be acceptable where the AFR is based on real historical data). Note that such policies might be applied either at the resource manager level or alternatively at the box manager level in its initial determination and provision of AFR information to the resource manager.

Although the prediction of failure rates described herein has generally been presented in the context of computer systems, it is applicable to a very wide range of electronic apparatus. This includes a broad variety of computers, ranging from large-scale servers down to personal computers and beyond, as well as many other electronic systems, such as telecommunications apparatus, subsystems for transport devices such as cars and aeroplanes, and so on. The approach can also be used for monitoring and controlling installations such as power stations, factories, office buildings, and so on.

The software components described herein may comprise program instructions and/or data instructions on some fixed, non-volatile storage, such as a hard disk or flash memory. These instructions and/or data structures can then be loaded for use into random access memory (RAM) for execution and use by a system processor, an application specific integrated circuit (ASIC), or by any other such device. Rather than being stored on a hard disk or other fixed device, part or all of the program instructions and/or data structures may also be stored on a removable storage medium, such as an optical (CD ROM, DVD, etc), magnetic (floppy disk, tape, etc), or semiconductor (removable flash memory) device. Alternatively, the program instructions and/or data structures may be downloaded via a transmission signal medium over a network, for example, a local area network (LAN), the Internet, and so on.

In conclusion, a variety of particular embodiments have been described in detail herein, but it will be appreciated that this is by way of illustration only. The skilled person will be aware of many further potential modifications and adaptations that fall within the scope of the claimed invention and its equivalents.

The invention claimed is:

1. A method of determining a predicted failure rate in a system comprising multiple components, wherein said system provides one or more computational resources, the method comprising:
   storing failure rate information about individual components;
   determining a current configuration of components within the system;
   identifying from the current configuration dependencies between components within the system; and
   using the stored failure rate information and the identified current configuration dependencies to generate a predicted overall failure rate for each of said one or more computational resources provided by the system in its current configuration, wherein the overall failure rate for a computational resource represents a combined probability of failure for both the components within the computational resource and the components in devices that are not within the computational resource, but provide support for the computational resource.

2. The method of claim 1, wherein said predicted failure rates are generated by a box manager associated with the system.

3. The method of claim 2, further comprising reporting said predicted failure rates from the box manager to a resource manager, wherein the resource manager is responsible for allocating work to said one or more computational resources provided by the system.

4. The method of claim 2, wherein failure rate information relating to a field replaceable unit (FRU) is stored within the FRU itself, and is reported from the FRU to the box manager.

5. The method of claim 2, wherein at least some of the stored failure rate information about individual components is located remotely from the system and is retrieved by the box manager over a network.

6. The method of claim 1, further comprising using the identified configuration dependencies to determine one or more fault zones within the system, wherein no single point of failure can bring down more than one fault zone, and wherein each of said one or more computational resources is assigned to a corresponding fault zone.

7. The method of claim 6, wherein said faults zones are determined by a box manager associated with the system and are reported by the box manager along with the predicted failure rates to a resource manager.

8. The method of claim 1, further comprising:
   detecting a change in the configuration of the system; and
   updating the predicted failure rates in accordance with the changed configuration.

9. The method of claim 1, further comprising monitoring and recording parameters relating to the operational history of the system.

10. The method of claim 9, further comprising reporting the recorded parameters to a log site.

11. The method of claim 10, wherein said reporting is performed in response to a failure in the system.

12. The method of claim 9, further comprising using the recorded parameters to generate the predicted failure rates.

13. The method of claim 1, further comprising receiving over a network an updated model for generating the predicted failure rates.

14. A system comprising multiple components, said system providing one or more computational resources, the system further comprising:
   a configuration manager for determining a current configuration of components within the system and for identifying from the current configuration dependencies between components within the system; and
   a box manager for accessing stored failure rate information about individual components within the system and for using the stored failure rate information and the identified current configuration dependencies to generate a predicted overall failure rate for each of said one or more computational resources for the system in its current configuration, wherein the overall failure rate for a computational resource represents a combined probability of failure for both the components within the computational resource and the components in devices that are not within the computational resource, but provide support for the computational resource.

15. The system of claim 14, further comprising a resource manager responsible for allocating work to said one or more computational resources provided by the system, wherein the box manager is configured to report said predicted failure rates to the resource manager.

16. The system of claim 15, wherein failure rate information relating to a field replaceable unit (FRU) in the system is stored within the FRU itself for reporting from the FRU to the box manager.

17. The system of claim 14, wherein the box manager is configured to use the identified configuration dependencies to determine one or more fault zones within the system, wherein no single point of failure can bring down more than one fault zone, and wherein each of said one or more computational resources is assigned to a corresponding fault zone.

18. The system of claim 14, wherein the box manager is configured, in response to a detected change in the configuration of the system, to update the predicted failure rates in accordance with the changed configuration.

19. The system of claim 14, further comprising a monitor for recording parameters relating to the operational history of the system.

20. The system of claim 19, further comprising a communications facility for reporting the recorded parameters to a log site.

21. The system of claim 14, further comprising a communications interface for receiving an updated model for generating the predicted failure rates.

22. A method of operating a server comprising:

receiving communications over a network from a population of multiple systems, wherein each system monitors parameters relating to the operational history of that system, and wherein said communications report the monitored parameters to the server;

using the reported parameters to update a failure rate model for said population of multiple systems; and distributing from the server over the network to the population of multiple systems the updated failure rate model for use by a system belonging to the population of multiple systems in predicting failure rates for that system.

23. The method of claim 22, wherein said failure rate model is sensitive to the operational history of a system.

* * * * *